(12) United States Patent
Spector

(10) Patent No.: US 8,326,149 B2
(45) Date of Patent: Dec. 4, 2012

(54) DYNAMIC BANDWIDTH ALLOCATION IN A PASSIVE OPTICAL NETWORK IN WHICH DIFFERENT OPTICAL NETWORK UNITS TRANSMIT AT DIFFERENT RATES

(75) Inventor: Oren Spector, Haifa (IL)

(73) Assignee: PMC Sierra Ltd., Herzlia Pituach (IL)

( * ) Notice: Subject to any disclaimer, the term of this patent is extended or adjusted under 35 U.S.C. 154(b) by 460 days.

(21) Appl. No.: 12/690,123

(22) Filed: Jan. 20, 2010

(65) Prior Publication Data

US 2010/0183304 A1    Jul. 22, 2010

Related U.S. Application Data

(60) Provisional application No. 61/145,755, filed on Jan. 20, 2009.

(51) Int. Cl.
*H04J 14/00* (2006.01)
(52) U.S. Cl. ............... 398/66; 398/69; 398/70
(58) Field of Classification Search ............... 398/63–72
See application file for complete search history.

(56) References Cited

U.S. PATENT DOCUMENTS

| | | | |
|---|---|---|---|
| 2006/0268704 A1* | 11/2006 | Ansari et al. | 370/230 |
| 2007/0133557 A1* | 6/2007 | Lee et al. | 370/395.4 |
| 2008/0205443 A1* | 8/2008 | Shi et al. | 370/468 |
| 2009/0097861 A1* | 4/2009 | Ikeda et al. | 398/167.5 |
| 2009/0202242 A1* | 8/2009 | Niibe et al. | 398/63 |

FOREIGN PATENT DOCUMENTS

| | | |
|---|---|---|
| JP | 2003078561 | 3/2003 |
| JP | WO2005062543 | 12/2004 |
| JP | 2008270898 | 6/2008 |

OTHER PUBLICATIONS

IEEE Standard for Information technology—Telecommunications and information exchange between systems—Local and metropolitan area networks—Specific requirements, Part 3: Carrier Sence Muliple Access With Collision Detection (CSMA/CD) Access Method and Physical Layer Specifications, IEEE STD 802.av, Oct. 30, 2009, pp. 1-214.
Yoshihara et al J-PON DBA: Proposed Multi-rate Scheduling method in G-PON DBA, p. 346, 2004.

* cited by examiner

*Primary Examiner* — Dzung Tran
(74) *Attorney, Agent, or Firm* — Mark M Friedman

(57) ABSTRACT

An OLT allocates a bandwidth budget and assigns upstream transmission order by receiving upstream transmission requests from a plurality of ONUs. Each ONU's request includes a requested guaranteed bandwidth and a requested best effort bandwidth. Each ONU has respective first and second attribute values. One attribute is given allocation priority over the other attribute. One attribute is given scheduling priority over the other attribute. Within each attribute, an allocation rank and a transmission rank is assigned to the possible attribute values. The bandwidth budget is allocated in accordance with the allocation priority and ranks. The upstream transmissions are scheduled in accordance with the scheduling priority and ranks.

26 Claims, 3 Drawing Sheets

DYNAMIC BANDWIDTH ALLOCATION IN A PASSIVE OPTICAL NETWORK IN WHICH DIFFERENT OPTICAL NETWORK UNITS TRANSMIT AT DIFFERENT RATES

This is a continuation-in-part of U.S. Provisional Patent Application No. 61/145,755, filed Jan. 20, 2010

FIELD AND BACKGROUND OF THE INVENTION

The present invention relates to passive optical networks (PONs), especially to a PON whose optical network units (ONUs) transmit at different rates.

FIG. 1 shows the architecture of a generic PON 10. An optical line terminal (OLT) 12 is connected to several (typically between 32 and 128; only three are shown for clarity) ONUs 14 via an optical splitter 16. Downstream signals (OLT to ONU) are broadcast to all the ONUs. Encryption is used to prevent eavesdropping. Upstream signals (ONU to OLT) are combined using a multiple access protocol, usually a time division multiple access (TDMA) protocol.

The invention described herein is described in terms of an Ethernet PON (EPON). It will be apparent to those skilled in the art how to modify the description for other kinds of PONs. In an EPON, the ONUs send REPORT frames to the OLT to request permission to transmit upstream and the OLT replies with GATE frames that tell the OLTs when and how much to transmit. The OLT runs a dynamic bandwidth allocation (DBA) algorithm to control the upstream data transmission of the ONUs. To make the DBA implementation flexible, many OLTs run their DBA algorithms in software. To reduce the CPU power needed to implement the algorithm, some operations are done using dedicated hardware accelerators. These operations include:

Parsing REPORT frames
Formatting GATE frames
Building the upstream timeline
Allocation based on parsed REPORT information (optional)
Granting order (optional)
Round trip time (RTT) calculation The emerging IEEE802.3av (10G EPON) standard requires designing a new DBA algorithm that can handle upstream allocation of both 1G transmitting ONUs and 10G transmitting ONUs because the standard uses the same wavelength for both 10G upstream and 1G upstream, with TDMA separation. Two main issues arise:

1. The OLT optical transceiver is a dual mode transceiver. Switching back and forth between 1G receive mode and 10G receive mode requires some overhead.

2. In the same time period, a 10G ONU transmits ten times as much information as a 1G ONU. This has implications for the fairness of allocation between 1G ONUs and 10G ONUs.

The CPU processing time of the current DBA algorithm is considerable. This is because the algorithm needs to monitor the bandwidth request and the transmission rate of the ONUs and to make sure that the ONUs' service level agreement (SLA) is enforced. Furthermore, the algorithm must assure fairness among the ONUs. The algorithm does this by sorting the ONUs according to a fairness criterion. This sorting adds considerable processing time.

Under the EPON standard, an ONU is required to report only its queue occupancy. The EPON standard does not allow fragmentation of frames during ONU upstream transmission. This can result in utilization loss, because up to a maximum transmission unit (MTU) frame size (1538 bytes) might be unutilized per allocation. To overcome this problem, in an optional, more advanced reporting mode ("threshold mode"), the ONU also reports the number of whole frames in each queue under some configurable threshold and its total queue status. The value under threshold and the total value are multiples of a whole frame size. Each value is reported in a different set in the REPORT frame.

In threshold mode, the ONU also has a queue freezing mechanism. When the ONU generates a REPORT, the ONU freezes its queues, so that when a future allocation is given the ONU sends frames from its frozen queues before sending any new frames that arrived after the queue freezing. Thus, the DBA algorithm can allocate either the value below the threshold or the total value and so prevent fragmentation loss. As noted above, the DBA needs to monitor the transmitted rate of each ONU and needs to decide how much bandwidth to allocate to the ONU to enforce the ONU's SLA.

SUMMARY OF THE INVENTION

According to the present invention there is provided a method of assigning a transmission order in an optical network, including the steps of: (a) receiving, from a plurality of optical network units, each of which has a respective first attribute value selected from among a plurality of values of a first attribute of the optical network units and a respective second attribute value selected from among a plurality of values of a second attribute of the optical network units, respective requests for permission to effect respective upstream transmissions; (b) giving one attribute priority, for scheduling of the upstream transmissions over another attribute; (c) within each attribute, assigning a transmission rank to the values of the each attribute; and (d) scheduling the upstream transmissions in accordance with the priority and in accordance with the transmission ranks.

According to the present invention there is provided a shuffler module, for an optical line terminal that manages a plurality of optical network units, the shuffler module being operative: (a) to receive, from a plurality of optical network units, each of which has a respective first attribute value selected from among a plurality of values of a first attribute of the optical network units and a respective second attribute value selected from among a plurality of values of a second attribute of the optical network units, respective requests for permission to effect respective upstream transmissions; (b) to give one attribute priority, for scheduling of the upstream transmissions, over another attribute; (c) within each attribute, to assign a transmission rank to the values of the each attribute; and (d) to schedule the upstream transmissions in accordance with the priority and in accordance with the transmission ranks.

According to the present invention there is provided a method of allocating a bandwidth budget on an optical network, including the steps of: (a) receiving, from a plurality of optical network units, respective requests for permission to effect respective upstream transmissions, each optical network unit having a respective first attribute value selected from among a plurality of values of a first attribute of the optical network units and a respective second attribute value selected from among a plurality of values of a second attribute of the optical network units; (b) giving one attribute priority, for allocating the bandwidth budget, over another attribute; (c) within each attribute, assigning a transmission rank to the values of the each attribute; and (d) allocating the bandwidth budget in accordance with the priority and in accordance with the transmission ranks.

According to the present invention there is provided a bandwidth allocation module, for an optical line terminal that manages a plurality of optical network units, the bandwidth allocation module being operative: (a) to receive, from a plurality of optical network units, each of which has a respective first attribute value selected from among a plurality of values of a first attribute of the optical network units and a respective second attribute value selected from among a plurality of values of a second attribute of the optical network units, respective requests for permission to effect respective upstream transmissions; (b) to give one attribute priority, for allocating the bandwidth budget, over another attribute; (c) within each attribute, to assign a transmission rank to the values of the each attribute; and (d) to allocate the bandwidth budget in accordance with the priority and in accordance with the transmission ranks.

According to the present invention there is provided a method for an optical network unit to request upstream transmission bandwidth from an optical line is terminal, including the steps of (a) sending the optical line terminal a requested guaranteed bandwidth; and (b) sending the optical line terminal a requested best effort bandwidth.

According to the present invention there is provided an optical network unit operative to request upstream bandwidth from an optical line terminal by: (a) sending the optical line terminal a requested guaranteed bandwidth; and (b) sending the optical line terminal a requested best effort bandwidth.

A method of assigning a transmission order in an optical network starts with receiving, from a plurality of ONUs, respective requests for permission to transmit upstream. Each ONU has a respective first attribute value selected from among a plurality of possible values of a first ONU attribute and a respective second attribute value selected from among a plurality of possible values of a second ONU attribute. For example, in the preferred embodiments described below, the attributes are transmission speed (specifically, 10G vs. 1G) and ONU type. One of the attributes is given priority over the other attribute for scheduling the upstream transmissions (i.e., for determining the order in which the ONUs transmit): either the first attribute is given priority over the second attribute or the second attribute is given priority over the first attribute. For example, in the preferred embodiments described below, transmission speed is given priority over ONU type, so that e.g. all 10G ONUs of all types transmit before all 1G ONUs of all types. Within each attribute, a transmission rank is assigned to the attribute values. Note that possible ranks include "don't care" (all the attribute values have the same rank, so that the attribute values are not taken into account in the scheduling) and "ignore" (do not allow an ONU with this value of this attribute to transmit). Then, the upstream transmissions are scheduled in accordance with the priority and in accordance with the ranks.

The scope of the present invention also includes an OLT shuffler module that effects this method of assigning a transmission order and an OLT that includes such a shuffler module. Preferably, the shuffler module is implemented as a hardware accelerator.

A basic method of allocating a bandwidth budget on an optical network starts with receiving, from a plurality of ONUs, respective requests for permission to transmit upstream. Each ONU has a respective first attribute value selected from among a plurality of possible values of a first ONU attribute and a respective second attribute value selected from among a plurality of possible values of a second ONU attribute. For example, in the preferred embodiments described below, the attributes are transmission speed (specifically, 10G vs. 1G) and ONU type. One of the attributes is given priority over the other attribute for allocating the bandwidth budget (i.e., for determining which ONUs are allowed to transmit, and with how much of the bandwidth budget each of these ONUs is allowed to transmit): either the first attribute is given priority over the second attribute or the second attribute is given priority over the first attribute. For example, in the preferred embodiments described below, transmission speed is given priority over ONU type, so that e.g. all 10G ONUs of all types receive permission to transmit before any 1G ONUs of any types. Alternatively, ONU type could be given priority over transmission speed. Within each attribute, an allocation rank is assigned to the attribute values. Note that possible ranks include "don't care" (all the attribute values have the same rank, so that the attribute values are not taken into account in the allocation) and "ignore" (do not allocate bandwidth to an ONU with this value of this attribute). Then, the bandwidth budget is allocated in accordance with the priority and in accordance with the ranks.

Preferably, each request includes a requested guaranteed bandwidth. The allocating includes selecting the ONUs that are allowed to transmit upstream by assigning each ONU successively, in an order determined by the priority and by the transmission ranks, a respective portion of the bandwidth budget that is less than or equal to the ONU's respective requested guaranteed bandwidth, until either the bandwidth budget is exhausted (in which case one or more ONUs don't get to transmit, and/or the last ONU that transmits less than its requested guaranteed bandwidth) or all the ONUs are assigned their requested guaranteed bandwidths. Most preferably, the successive assigning is in ascending order of the ONUs' respective ratios of estimated transmission rates to requested guaranteed bandwidth. Also most preferably, the requested guaranteed bandwidths are clipped before the bandwidth budget is allocated.

More preferably, each request also includes a requested best effort bandwidth. If there is bandwidth budget left over after the guaranteed bandwidths have been allocated, then the allocating includes assigning each ONU successively, in an order determined by the priority and by the transmission ranks, a respective portion of the bandwidth budget that is less than or equal to the ONU's respective requested best effort bandwidth, until either the bandwidth budget is exhausted (in which case one or more ONUs transmit only their guaranteed bandwidths, and/or one of the ONUs transmits more than its requested guaranteed bandwidth but less than its requested best effort bandwidth) or all the ONUs are assigned their requested best effort bandwidths. Most preferably, the requested best effort bandwidths are clipped before the bandwidth budget is allocated.

The scope of the present invention also includes an OLT bandwidth allocation module that effects this method of allocating a bandwidth budget and an OLT that includes such a bandwidth allocation module. Preferably, the bandwidth allocation module is implemented as a hardware accelerator.

In a basic method for an ONU to request upstream transmission bandwidth from an OLT, the ONU sends the OLT a requested guaranteed bandwidth and a requested best effort bandwidth. Preferably, the method also includes computing the requested guaranteed bandwidth and the requested best effort bandwidth. Most preferably, the method also includes receiving a SLA from the OLT. The requested guaranteed bandwidth and the requested best effort bandwidth then are computed in accordance with the SLA.

More preferably, the requested guaranteed bandwidth and the requested best effort bandwidth are computed using a token bucket algorithm that has two different respective token buckets for the requested guaranteed bandwidth and the requested best effort bandwidth. Most preferably, the requested guaranteed bandwidth is computed as the lesser of the used queue size of the optical network unit and the number of tokens in the respective token bucket of the requested guaranteed bandwidth, or else as the total size of whole frames up to a threshold computed as the lesser of the used queue size of the optical network unit and the number of tokens in the respective token bucket of the requested guaranteed bandwidth; and the requested best effort bandwidth is computed as the lesser of the used queue size of the optical network unit and the number of tokens in the respective token bucket of the best effort guaranteed bandwidth, or else as the total size of whole frames up to a threshold computed as the lesser of the used queue size of the optical network unit and the number of tokens in the respective token bucket of the best effort guaranteed bandwidth.

The scope of the present invention also includes an ONU that uses the basic method to request upstream transmission bandwidth from an OLT.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

Figure 1:
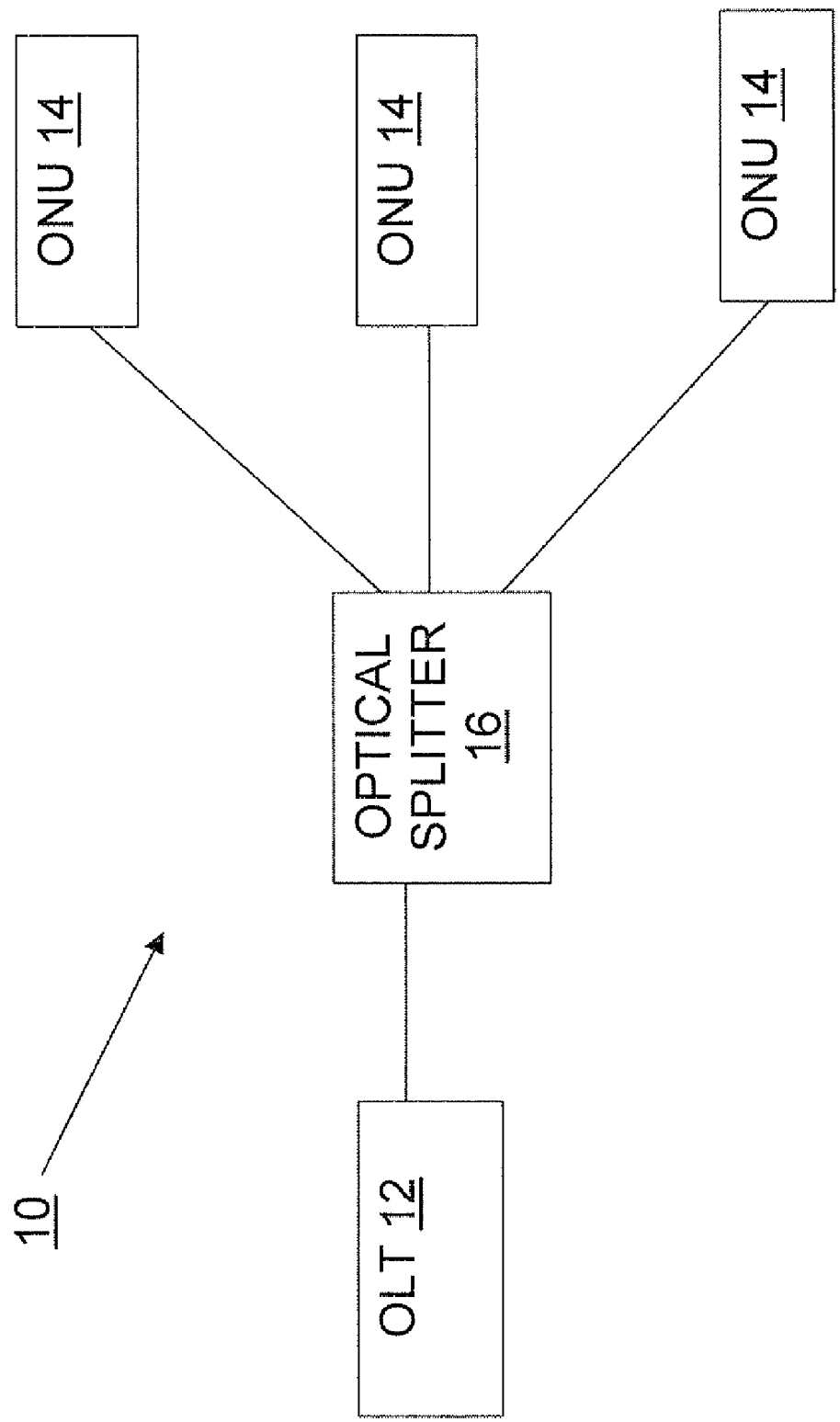
FIG. 1 shows the architecture of a generic PON.

The principles and operation of a PON according to the present invention may be better understood with reference to the drawings and the accompanying description.

Each ONU's SLA includes the ONU's guaranteed bandwidth and the ONU's best effort bandwidth. Guaranteed bandwidth should not be oversubscribed. Best effort bandwidth can be oversubscribed.

A conventional DBA algorithm relies on the REPORT frames sent by the ONUs to decide how much bandwidth each ONU needs. The algorithm has two phases: guaranteed bandwidth allocation and best effort bandwidth allocation. The present invention includes an ONU reporting mechanism that relieves the DBA algorithm of some of its CPU burden for SLA enforcement. Specifically, each ONU requests a guaranteed bandwidth and a best-effort bandwidth. Preferably, these requests are integral multiples of frames. In each transmission cycle, the associated DBA algorithm either allocates the ONU some bandwidth between the requested guaranteed bandwidth and the requested best-effort bandwidth or denies the ONU permission to transmit. If the ONU is denied permission to transmit, the ONU's requests are increased and the ONU is given preference in the next transmission cycle. Over time, the ONU's SLA is enforced.

The OLT uses an operations administration and maintenance (OAM) message to notify each ONU of its SLA. Each ONU has a reporting mechanism that reports the ONU's guaranteed bandwidth request and the ONU's best effort request. Each request is reported in a different REPORT set. If the OLT allocates the ONU its guaranteed request then the ONU does not transmit more than its SLA guaranteed bandwidth on average. If the OLT allocates the ONU its best effort request then the ONU does not transmit more than its SLA best effort bandwidth on average. A (preferably hardware-based) OLT transmission rate estimator in the OLT estimates each ONU's actual transmission rate. A (preferably hardware-based) ONU sorting engine sorts the ONUs for transmission based on the ratio of the ONU's transmission rate to the guaranteed bandwidth defined in the ONU's SLA. The OLT's REPORT parser clips the ONUs' guaranteed bandwidth requests and best effort bandwidth requests to prevent malicious ONUs from requesting more bandwidth than they deserve according to their SLAs. The hardware-based allocator described below uses the clipped bandwidth requests to allocate bandwidth to the ONUs. All the DBA to software needs to do is to read the sorted ONU order and write the sorted ONU order back to the hardware for the allocation phase. Apart from low CPU requirements this scheme has the advantage that the traffic delay is very low, since the time between receiving a REPORT and sending a GATE based on this REPORT can be very short.

Alternatively, the DBA software uses the clipped bandwidth requests to allocate bandwidth to the ONUs, in two loops. The first loop is based on the guaranteed request. The second loop is based on the best effort request and the allocation order is based on the sorting done by the ONU sorting engine.

In some embodiments of a PON, one or more of the ONUs include several flows. In such a case, the transmission rate estimation and sorting are based on flows. The DBA software is modified by adding a phase for deciding the best effort allocation order of the ONUs based on the sorted flows. If the OLT uses a hardware-based allocator, then this order is written to the hardware-based allocator. If the OLT uses DBA software to allocate bandwidth to the ONUs then this order is used for the best effort allocation phase (the second loop).

One method of transmission rate estimation and sorting based on flows is as follows. It is known in advance which ONU each flow belongs to. The flows are sorted in ascending order according to the flows' ratios of transmission rate to guaranteed bandwidth (as defined in the respective ONUS' SLAs). The ONU of the last flow in the list is the last flow to be allocated. Going backwards through the list, each time a new ONU is encountered (meaning that the flow belongs to an ONU that hasn't been encountered before) that ONU is allocated ahead of the ONU allocated previously.

Each ONU generates its bandwidth requests as follows.

Each ONU has two token buckets (or two token buckets per flow, if the ONU supports more than one flow), one for guaranteed bandwidth and the other for best effort bandwidth.

At regular intervals, e.g. every 0.5 milliseconds, the ONU adds a number of tokens, based on the ONU's SLA, to the guaranteed bandwidth token bucket, and adds a number of tokens, also based on the ONU's SLA, to the best effort bandwidth token bucket. For example, if the guaranteed bandwidth of the ONU is X Mbps and a token represents a single bit then 500X tokens are added to the guaranteed bandwidth token bucket every 0.5 milliseconds, and if the best effort bandwidth of the ONU is Y Mbps and a token represents a single bit then 500Y tokens are added to the guaranteed bandwidth token bucket every 0.5 milliseconds.

There are two ways for an ONU to generate a REPORT.

In the first way of generating a REPORT, the ONU calculates the smaller of the ONU used queue size and the number of tokens in the guaranteed bandwidth token bucket (both measured e.g. in bits). This value is converted to time quanta (TQ) units (1 TQ=16 ns=16 bits for a 1G ONU=160 bits for a 10G ONU) and is reported as the ONU's requested guaranteed bandwidth. The ONU also calculates the smaller of the ONU used queue size and the number of tokens in the best effort bandwidth token bucket. This value is converted to TQ units and added to the requested guaranteed bandwidth to provide the number of TQ units that is reported as the ONU's requested best effort bandwidth.

The second way to generate a report is more complex but is preferable because it avoids partially utilized bandwidth allocations. As in the first way, the ONU calculates the smaller of the ONU used queue size and the number of tokens in the guaranteed bandwidth token bucket, but now this value is used as a threshold. The ONU checks how many whole frames can fit under this threshold and reports the total size of those frames (in TQ units) as the requested guaranteed bandwidth. Also as in the first way, the ONU also calculates the smaller of the ONU queue size and the number of tokens in the best effort bandwidth token bucket, but now this value is used as a threshold. The ONU checks how many whole frames can fit under this threshold and reports the total size of those frames (in TQ units) as the requested best effort bandwidth. The ONU freezes its queues when generating these bandwidth requests to make sure that if the OLT allocates the ONU one of the two requested bandwidths then the allocation will be fully utilized.

Note that this reporting mechanism is a negative feedback loop. If in one transmission cycle an ONU is allocated less bandwidth than it requires (and deserves) then in the next transmission cycle when the ONU calculates its REPORT the ONU's credits usually will be larger and the ONU will report higher requested bandwidths. If in one transmission cycle an ONU is allocated more bandwidth than it deserves then in the next transmission cycle when the ONU calculates its REPORT the ONU's credits will be smaller and the ONU will report lower requested bandwidths.

The following steps describe the ONU behavior once a transmission window has begun:

1. If the end time of the transmission window has passed, stop.
2. Select a non-empty queue according to some scheduling algorithm (e.g., strict priority or weighted round robin).
3. If no such queue is available, return to step 1.
4. Checks the frame at the head of the selected queue against the following conditions:
   a. The frame size (plus overhead) in TQ units is less than or equal to the remaining transmission time in TQ units.
   b. The frame size in token units is less than or equal to the number of tokens in one of the relevant token buckets (i.e., the token buckets of the ONU if the ONU does not support flows, or the token buckets of the relevant flow if the ONU supports more than one flow).
5. If the frame does not meet both conditions, return to step 1.
6. Transmit the frame.
7. Return to step 1.

When an ONU transmits a frame in step 6:

If the frame size is smaller than the number of tokens in the guaranteed bandwidth token bucket then a number of tokens equal to the frame size is removed from the guaranteed bandwidth token bucket. Optionally, the same number of tokens also is removed from the best effort token bucket.

If the frame size is larger than the number of tokens in the guaranteed bandwidth token bucket but smaller than the number of tokens in the best effort token bucket then a number of tokens equal to the frame size is removed from the best effort bandwidth token bucket.

For each ONU, the OLT's hardware-based transmission rate estimator estimates the ONU's transmission rate (tx_rate [ONU]). The input to the estimation is the amount of information transmitted during a certain (configurable) period of time by the ONU (tx_amount[ONU]) and the transmission rate during the immediately preceding period of time (prev_tx_rate[ONU]). tx_rate[ONU] is estimated as a weighted average: tx_rate[ONU] (prev_tx_rate[ONU]*alpha)+(tx_amount[ONU]*(1−alpha)), where alpha is a configurable value between 0 and 1. Then the OLT's hardware-based ONU sorting engine sorts the ONUs in ascending order according to the ratio tx_rate[ONU]/(guaranteed bandwidth of the ONU's SLA).

Now, the OLT needs to decide which ONUs in the sorted list will be allowed to transmit in the present transmission cycle. The input for each ONU is the ONU's requested guaranteed bandwidth (gr_req[ONU]) and the ONU's requested best effort bandwidth (be_req[ONU]). These bandwidth requests are clipped: gr_clipped_req[ONU]=min (gr_req [ONU], gr_req_limit[ONU]) and be_clipped_req[ONU]= min (be_req[ONU], be_req_limit[ONU]), where gr_req_limit[ONU] and be_req_limit[ONU] are configurable limits set in the OLT per ONU. Then a hardware-based allocator decides which ONUs actually will transmit during the present transmission cycle and a hardware-based shuffler determines the order in which the ONUs transmit.

The hardware-based allocator of the present invention is an improvement of a conventional hardware-based allocator that has two allocation schemes, TYPE1 and TYPE1_TYPE2. In TYPE1 allocation, any allocation order is possible provided that only ONUs of TYPE1 are included. This means that in one iteration, the allocator goes down the sorted list of ONUs and selects ONUs of TYPE1 for allocation until either all the bandwidth available for transmission in the present transmission cycle is used up or all the ONUs of TYPE1 have been selected. In TYPE1_TYPE2 allocation, any allocation order is possible provided that ONUs of TYPE1 are allocated before ONUs of TYPE2. This means that the allocator uses two iterations. In the first iteration, the allocator goes down the sorted list of ONUs and selects ONUs of TYPE1 for allocation until either all the bandwidth available for transmission in the present transmission cycle is used up or all the ONUs of TYPE 1 have been selected. If there is bandwidth left over after the first iteration then in the second iteration the allocator again goes down the sorted list of ONUs and selects ONUs of TYPE2 for transmission until either all the bandwidth available for transmission in the present transmission cycle is used up or all the ONUs of TYPE2 have been selected.

According to the present invention, two new configurations are added to the hardware-based allocator to accommodate the presence of ONUs that transmit at different speeds (1G vs. 10G). The two new configurations are allocation priority and grouping mode. Allocation priority has two values: GROUPING_HIGH (sort on speed before sorting on type) and GROUPING_LOW (sort on type before sorting on speed). Grouping mode has three values: NO_GROUPING, 10G_1G_GROUPING and 1G_10G_GROUPING. The following table summarizes the allocation outcomes for the different possible combinations:

| Allocation scheme | Allocation priority | Grouping mode | Allocation outcome |
| --- | --- | --- | --- |
| TYPE1 | GROUPING_HIGH | NO_GROUPING | TYPE1 |
| TYPE1 | GROUPING_HIGH | 10G_1G_GROUPING | 10G + TYPE1, 1G + TYPE1 |
| TYPE1 | GROUPING_HIGH | 1G_10G_GROUPING | 1G + TYPE1, 10G + TYPE1 |
| TYPE1 | GROUPING_LOW | NO_GROUPING | TYPE1 |
| TYPE1 | GROUPING_LOW | 10G_1G_GROUPING | 10G + TYPE1, 1G + TYPE1 |
| TYPE1 | GROUPING_LOW | 1G_10G_GROUPING | 1G + TYPE1, 10G + TYPE1 |
| TYPE1_TYPE2 | GROUPING_HIGH | NO_GROUPING | TYPE1, TYPE2 |
| TYPE1_TYPE2 | GROUPING_HIGH | 10G_1G_GROUPING | 10G + TYPE1, 10G + TYPE2, 1G + TYPE1, 1G + TYPE2 |
| TYPE1_TYPE2 | GROUPING_HIGH | 1G_10G_GROUPING | 1G + TYPE1, 1G + TYPE2, 10G + TYPE1, 10G + TYPE2 |
| TYPE1_TYPE2 | GROUPING_LOW | NO_GROUPING | TYPE1, TYPE2 |
| TYPE1_TYPE2 | GROUPING_LOW | 10G_1G_GROUPING | 10G + TYPE1, 1G + TYPE1, 10G + TYPE2, 1G + TYPE2 |
| TYPE1_TYPE2 | GROUPING_LOW | 1G_10G_GROUPING | 1G + TYPE1, 10G + TYPE1, 1G + TYPE2, 10G + TYPE2 |

The following is an example of allocation with allocation scheme=TYPE1_TYPE2, allocation priority=GROUPING_HIGH and grouping mode=10G_1G_GROUPING. There are eight ONUs. The following table describes the attributes of the ONUs:

| ONU ID | Type(s) | Tx rate |
| --- | --- | --- |
| 1 | TYPE2 | 1G |
| 2 | TYPE1 | 1G |
| 3 | TYPE1, TYPE2 | 1G |
| 4 | TYPE1 | 10G |
| 5 | TYPE2 | 10G |
| 6 | TYPE1, TYPE2 | 10G |
| 7 | TYPE1, TYPE2 | 1G |
| 8 | TYPE1, TYPE2 | 10G |

In this example, the sorted list from the hardware-based ONU sorting engine is (6, 7, 2, 5, 8, 4, 1, 3). A bandwidth budget, measured in TQ, needs to be allocated to the WV's. The allocation is done in four iterations. In each iteration, one of the four values the DBA accelerators produce per each REPORT frame (gr_clipped_req and be_clipped_req are examples of such values) is used to determine how much of the available bandwidth each ONU is allocated.

Iteration 1: select from the sorted list the ONUs that have a 10G transmission rate and are of TYPE1, in the order in which the ONUs appear in the sorted list. These ONUs are 6, 8, and 4. As each ONU is selected, subtract up to its iteration-1 value from the bandwidth budget. No ONU can be allocated more bandwidth than is left in the bandwidth budget. For example, if the initial bandwidth budget is 100 TQ and iteration-1 values of ONUs 6, 8 and 4 are 30 TQ, 30 TQ and 30 TQ, then each ONU is allocated 30 TQ. If the initial bandwidth budget is 100 TQ and the iteration-1 values of ONUs 6, 8 and 4 are 40 TQ, 30 TQ and 50 TQ, then ONU 6 is allocated 40 TQ, ONU 8 is allocated 30 TQ and ONU 4 is allocated only 30 TQ.

If there is bandwidth budget left over at the end of iteration 1, proceed to iteration 2.

Iteration 2: select from the sorted list the ONUs that have a 10G transmission rate and are of TYPE2, in the order in which the ONUs appear in the sorted list.

These ONUs are 6, 5 and 8. As each ONU is selected, subtract up to its iteration-2 value from the bandwidth budget and, add what has been subtracted from the bandwidth budget to the ONU's bandwidth allocation. Note that (if there is enough bandwidth budget) each of ONUs 6 and 8 now has been allocated the sum of its iteration-1 value and its iteration-2 value.

If there is bandwidth budget left over at the end of iteration 2, proceed to iteration 3.

Iteration 3: select from the sorted list the ONUs that have a 1G transmission rate and are of TYPE 1, in the order in which the ONUs appear in the sorted list. These ONUs are 7, 2 and 3. As each ONU is selected, subtract up to its iteration-3 value from the bandwidth budget and add what has been subtracted from the bandwidth budget to the ONU's bandwidth allocation.

If there is bandwidth budget left over at the end of iteration 3, proceed to iteration 4.

Iteration 4: select from the sorted list the ONUs that have a 1G transmission rate and are of TYPE 2, in the order in which the ONUs appear in the sorted list. These ONUs are 7, 1 and 3. As each ONU is selected, subtract up to its iteration-4 value from the bandwidth budget and add what has been subtracted from the bandwidth budget to the ONU's bandwidth allocation. Note that (if there is enough bandwidth budget) each of ONUs 3 and 7 now has been allocated the sum of its iteration-3 value and its iteration-4 value.

This example is presented only to illustrate the general functionality of the hardware-based allocator of the present invention. In the context of the purpose of the present invention (fair and efficient allocation of bandwidth among ONUs of different transmission speeds), the allocation phase allocates the guaranteed bandwidth and then, if possible, allocates the best effort bandwidth. One preferred allocation uses allocation scheme=TYPE1_TYPE2 and allocation priority=GROUPING_LOW, and toggles grouping mode between 10G_1G_GROUPING and 1G_10G_GROUPING with 10G_1G_GROUPING being used for ten transmission cycles followed by one cycle of 1G_10G_GROUPING. The value of both TYPE1 and TYPE2 is ALL, so that TYPE is ignored.

While the grouping mode is 10G_1G_GROUPING, the allocation is performed in four iterations.

In the first iteration, the iteration value is gr_clipped_req and the 10G ONUs are given their clipped requested guaranteed bandwidths. In the second iteration, the iteration value is gr_clipped_req and the 1G ONUs are given their clipped requested guaranteed bandwidths. It is assumed that the guaranteed bandwidth is not oversubscribed, which means that the clipping is such that the sum of all the gr_clipped_req's does not exceed the initial bandwidth budget of the current transmission cycle.

In the third iteration, the iteration value is be_clipped_req and the 10G ONUs are given up to their clipped requested best effort bandwidths, in the order in which the 10G ONUs appear in the sorted list, as long as there is bandwidth left in the bandwidth budget to give them. In the fourth iteration, the iteration value is be_clipped_req and the 1G ONUs are given up to their clipped requested best effort bandwidths, in the order in which the 1G ONUs appear in the sorted list, as long as there is bandwidth left in the bandwidth budget to give them.

While the grouping mode is 1G_10G_GROUPING, the allocation is performed similarly, in four iterations, but the roles of the 1G and 10G ONUs are switched. In the first iteration, the 1G ONUs are given their clipped requested guaranteed bandwidths. In the second iteration, the 10G ONUs are given their clipped requested guaranteed bandwidths. In the third iteration, the 1G ONUs are given up to their clipped requested best effort bandwidths. In the fourth iteration, the 10G ONUs are given up to their clipped requested best effort bandwidths.

The hardware-based shuffler of the present invention is similar to the hardware-based allocator of the present invention and is an improvement of a conventional hardware-based shuffler that has two shuffling schemes: ALL and TYPE1_TYPE2. In ALL shuffling, any shuffling order is possible (one iteration). In TYPE1_TYPE2 shuffling, any shuffling order is possible provided that ONUs of TYPE1 appear before ONUs of TYPE2 (two iterations).

According to the present invention, two new configurations are added to the hardware-based shuffler to accommodate the presence of ONUs that transmit at different speeds (1G vs. 10G) in order to minimize optical transceiver switching time overhead by grouping 1G allocations together in the upstream timeline and by grouping 10G allocations together in the upstream timeline. The two new configurations are shuffling priority and grouping mode. Shuffling priority has two values: GROUPING_HIGH (sort on speed before sorting on type) and GROUPING_LOW (sort on type before sorting on speed). Grouping mode has three values: NO_GROUPING, 10G_1G_GROUPING and 1G_10G_GROUPING. The following table summarizes the shuffling outcomes for the different possible combinations:

| Shuffling scheme | Shuffling priority | Grouping mode | Shuffling outcome |
| --- | --- | --- | --- |
| ALL | GROUPING_HIGH | NO_GROUPING | Any order |
| ALL | GROUPING_HIGH | 10G_1G_GROUPING | 10G, 1G |
| ALL | GROUPING_HIGH | 1G_10G_GROUPING | 1G, 10G |
| ALL | GROUPING_LOW | NO_GROUPING | Any order |
| ALL | GROUPING_LOW | 10G_1G_GROUPING | 10G, 1G |
| ALL | GROUPING_LOW | 1G_10G_GROUPING | 1G, 10G |
| TYPE1_TYPE2 | GROUPING_HIGH | NO_GROUPING | TYPE1, TYPE2 |
| TYPE1_TYPE2 | GROUPING_HIGH | 10G_1G_GROUPING | 10G + TYPE1, 10G + TYPE2, 1G + TYPE1, 1G + TYPE2 |
| TYPE1_TYPE2 | GROUPING_HIGH | 1G_10G_GROUPING | 1G + TYPE1, 1G + TYPE2, 10G + TYPE1, 10G + TYPE2 |
| TYPE1_TYPE2 | GROUPING_LOW | NO_GROUPING | TYPE1, TYPE2 |
| TYPE1_TYPE2 | GROUPING_LOW | 10G_1G_GROUPING | 10G + TYPE1, 1G + TYPE1, 10G + TYPE2, 1G + TYPE2 |
| TYPE1_TYPE2 | GROUPING_LOW | 1G_10G_GROUPING | 1G + TYPE1, 10G + TYPE1, 1G + TYPE2, 10G + TYPE2 |

The following is an example of shuffling with shuffling scheme TYPE1_TYPE2, shuffling priority=GROUPING_HIGH and grouping mode=10G_G_GROUPING. There are eight ONUs. The following table describes the attributes of the ONUs:

| ONU ID | Type | Tx rate |
| --- | --- | --- |
| 1 | TYPE1 | 1G |
| 2 | TYPE1 | 1G |
| 3 | TYPE1 | 1G |
| 4 | TYPE1 | 10G |
| 5 | TYPE1 | 10G |
| 6 | TYPE1 | 10G |
| 7 | TYPE2 | 1G |
| 8 | TYPE2 | 10G |

Suppose the allocation order of the ONUs is (6, 3, 2, 4, 7, 8, 1, 5). The ONUs are shuffled in four iterations. The first iteration selects all ONUs of TYPE1 that have a 10G transmission rate, in the order in which they appear in the allocation list: 6, 4, 5. The second iteration selects all ONUs of TYPE2 that have a 10G transmission rate, in the order in which they appear in the allocation list: 8. The third iteration selects all ONUs of TYPE1 that have a 1G transmission rate, in the order in which they appear in the allocation list: 3, 2, 1. The fourth iteration selects all ONUs of TYPE2 that have a 1G transmission rate, in the order in which they appear in the allocation list: 7. The transmission order is 6, 4, 5, 8, 3, 2, 1, 7.

Figure 2:
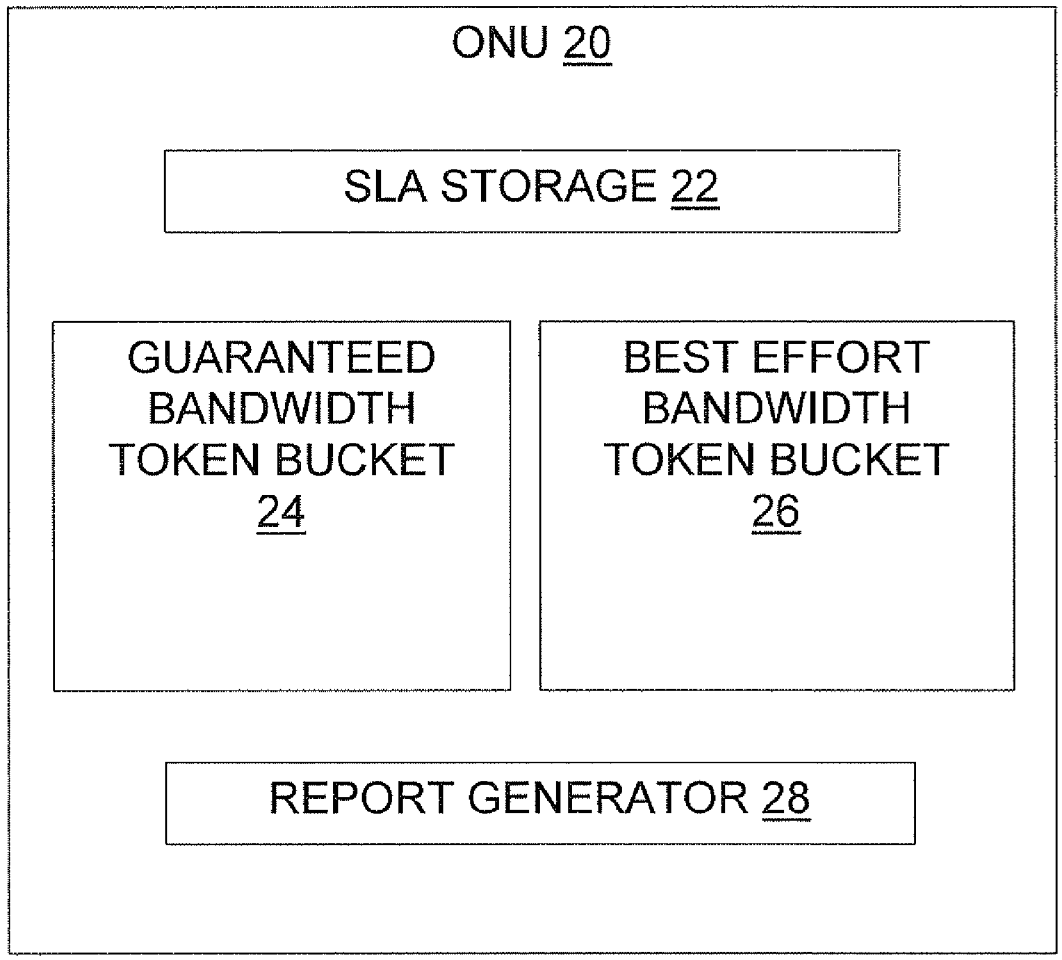
FIG. 2 is a functional block diagram of an ONU of the present invention.
Figure 3:
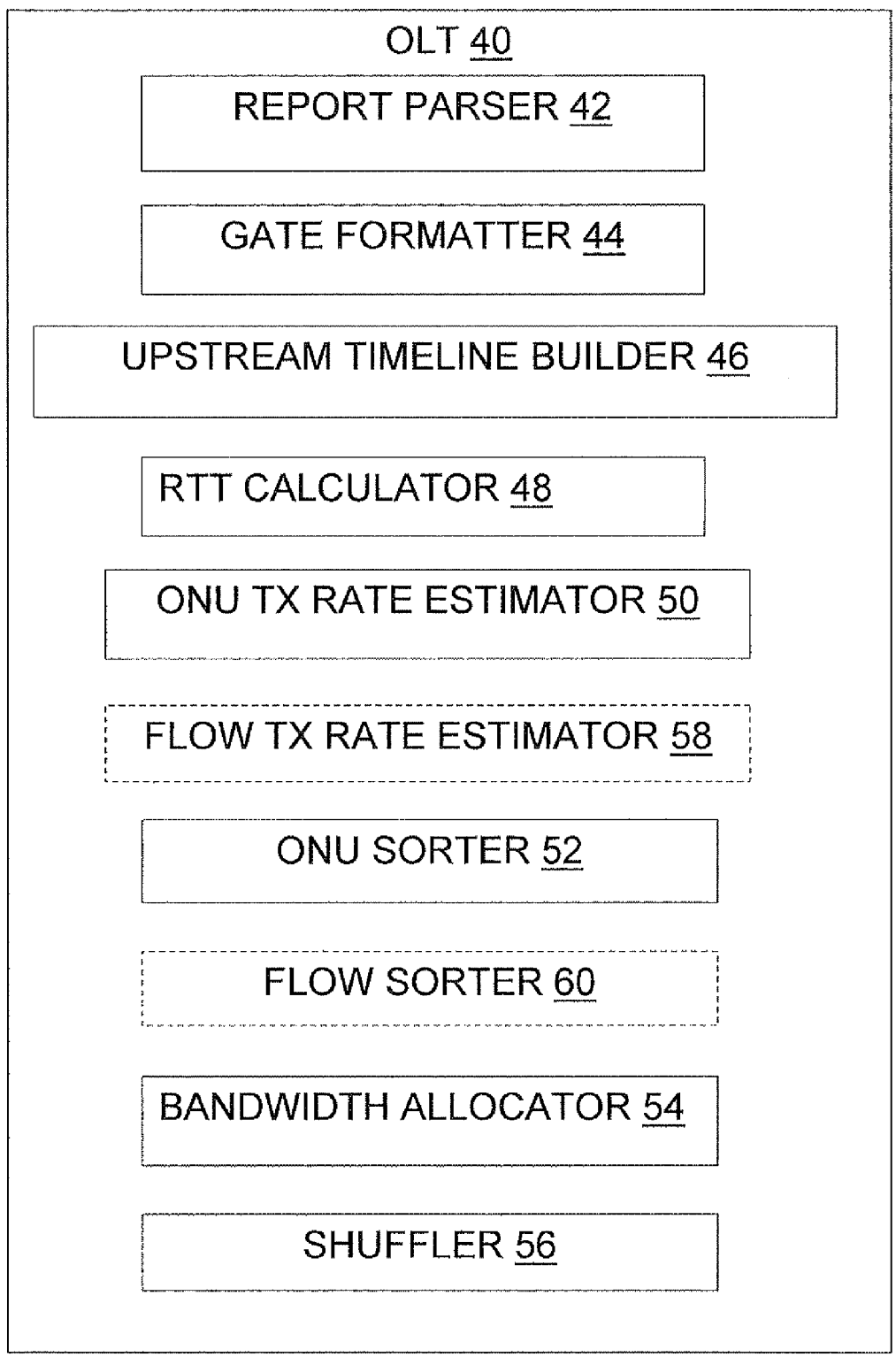
FIG. 3 is a functional block diagram of an OLT of the present invention.

Returning now, to the drawings, FIG. 2 is a functional block diagram of an ONU 20 of the present invention and FIG. 3 is a functional block diagram of an OLT 40 of the present invention. Only functional modules directly related to the present invention are shown.

The functional blocks of ONU 20 include a SLA storage module 22 for storing the SLA of ONU 20, a guaranteed bandwidth token bucket 24, a best effort token bucket 26 and a report generator module 28 that uses token buckets 24 and 26 in conjunction with the SLA stored in SLA storage module to generate REPORTs that include guaranteed bandwidth requests and best effort bandwidth requests as described above. (For simplicity, FIG. 2 shows ONU 20 with only one guaranteed token bucket 24 and only one best effort token bucket 26. An ONU that supports more than one flow would have one guaranteed token bucket 24 and one best effort token bucket 26 per flow.) The functional blocks of OLT 40 include a report parsing module 42 for parsing REPORTs received from the ONUs, a gate frame formatting module 44 for formatting GATE frames to send to the ONUs, an upstream timeline module building module 46 for building the upstream timeline, a round trip time calculating module 48 for calculating round trip times, an ONU transmission rate estimation module 50 for estimating the transmission rates of the ONUs, a ONU sorting module 52 for sorting the ONUs in ascending order of the ratio of the ONUs' transmission rates to the guaranteed bandwidths defined in the ONUs' respective SLAs, a bandwidth allocation module 54 for allocating bandwidth to the ONUs as described above, a shuffling module 56 for determining the order in which the ONUs transmit as described above, and, optionally (if one or more of the ONUs includes more than one flow), a flow transmission rate estimator 58 for estimating the transmission rates per flow and also a flow sorting module 60 for sorting the flows in ascending order of the ratio of the flows' transmission rates to the guaranteed bandwidths defined in the flows' ONUs' respective SLAs as described above.

Modules 22, 24, 26 and 28 of ONU 20 may be implemented in hardware, in firmware, in software or in any combination of hardware, firmware and software. Although in principle modules 42, 44, 46, 48 and 50 of OLT 40 could be implemented in firmware and/or in software, it is preferable to implement modules 42, 44, 46, 48 and 50 of OLT 40 as hardware accelerators, for the reasons discussed above.

If ONUs 20 are substituted for ONUs 14 of FIG. 1 and OLT 40 is substituted for OLT 12 of FIG. 1 then FIG. 1 serves to illustrate a PON of the present invention.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method of assigning a transmission order in an optical network, comprising the steps of:
   (a) receiving, from a plurality of optical network units, each of which has a respective first attribute value selected from among a plurality of values of a first attribute of said optical network units and a respective second attribute value selected from among a plurality of values of a second attribute of said optical network units, respective requests for permission to effect respective upstream transmissions;
   (b) giving one said attribute priority, for scheduling of said upstream transmissions, over another said attribute;
   (c) within each said attribute, assigning a transmission rank to said values of said each attribute; and
   (d) scheduling said upstream transmissions in accordance with said priority and in accordance with said transmission ranks.

2. The method of claim 1, wherein said first attribute is a speed of said optical network units and said second attribute is a type of said optical network units.

3. The method of claim 2, wherein said speed attribute is given priority over said type attribute, thereby reducing transmission speed switching time overhead.

4. The method of claim 1, further comprising the step of:
   (e) prior to said scheduling, allocating transmission bandwidth to all of said optical network units.

5. A shuffler module, for an optical line terminal that manages a plurality of optical network units, the shuffler module being operative:
   (a) to receive, from a plurality of optical network units, each of which has a respective first attribute value selected from among a plurality of values of a first attribute of said optical network units and a respective second attribute value selected from among a plurality of values of a second attribute of said optical network units, respective requests for permission to effect respective upstream transmissions;
   (b) to give one said attribute priority, for scheduling of said upstream transmissions, over another said attribute;
   (c) within each said attribute, to assign a transmission rank to said values of said each attribute; and
   (d) to schedule said upstream transmissions in accordance with said priority and in accordance with said transmission ranks.

6. The shuffler module of claim 5, implemented as a hardware accelerator.

7. An optical line terminal comprising the shuffler module of claim 5.

8. The shuffler module of claim 5, wherein said scheduling is effected after all of said optical networks have been allocated transmission bandwidth.

9. A method of allocating a bandwidth budget on an optical network, comprising the steps of:
   (a) receiving, from a plurality of optical network units, respective requests for permission to effect respective upstream transmissions, each said optical network unit having a respective first attribute value selected from among a plurality of values of a first attribute of said optical network units and a respective second attribute value selected from among a plurality of values of a second attribute of said optical network units;
   (b) giving one said attribute priority, for allocating the bandwidth budget, over another said attribute;
   (c) within each said attribute, assigning an allocation rank to said values of said each attribute; and (d) allocating the bandwidth budget in accordance with said priority and in accordance with said allocation ranks.

10. The method of claim 9, wherein said first attribute is a speed of said optical network units and said second attribute is a type of said optical network units.

11. The method of claim 10, wherein said speed attribute is given priority over said type attribute.

12. The method of claim 10, wherein said type attribute is given priority over said speed attribute.

13. The method of claim 9, wherein each said request includes a requested guaranteed bandwidth, and wherein said allocating includes selecting said optical network units that are to be allowed to effect their respective upstream transmissions by assigning each said optical network unit successively, in an order determined by said priority and by said transmission ranks, a respective portion of the bandwidth budget that equals at most said respective requested guaranteed bandwidth of said each optical network unit, until a condition, selected from the set consisting of:
(i) the bandwidth budget is exhausted, and
(ii) all said optical network units are assigned their respective requested guaranteed bandwidths,
is satisfied.

14. The method of claim 13, further comprising the step of:
(e) prior to said allocating, clipping said requested guaranteed bandwidths.

15. The method of claim 13, wherein each said request includes a requested best effort bandwidth, and wherein, if said allocating has assigned all said optical networks their respective requested guaranteed bandwidths, said allocating further includes successively, in an order determined by said priority and by said transmission ranks, increasing said respective portion of the bandwidth budget assigned to each said optical network unit to at most said respective requested best effort bandwidth of said each optical network unit, until a condition, selected from the set consisting of:
(i) the bandwidth budget is exhausted, and
(ii) all said optical networks have been assigned their respective requested best effort bandwidths, is satisfied.

16. The method of claim 15, further comprising the step of:
(e) prior to said allocating, clipping said requested best effort bandwidths.

17. A bandwidth allocation module, for an optical line terminal that manages a plurality of optical network units, the bandwidth allocation module being operative:
(a) to receive, from a plurality of optical network units, each of which has a respective first attribute value selected from among a plurality of values of a first attribute of said optical network units and a respective second attribute value selected from among a plurality of values of a second attribute of said optical network units, respective requests for permission to effect respective upstream transmissions;
(b) to give one said attribute priority, for allocating the bandwidth budget, over another said attribute;
(c) within each said attribute, to assign an allocation rank to said values of said each attribute; and
(d) to allocate the bandwidth budget in accordance with said priority and in accordance with said allocation ranks.

18. The bandwidth allocation module of claim 17, implemented as a hardware accelerator.

19. An optical line terminal comprising the bandwidth allocation module of claim 17.

20. A method for an optical network unit to request upstream transmission bandwidth from an optical line terminal, comprising the steps of:
(a) computing a requested guaranteed bandwidth;
(b) computing a requested best effort bandwidth;
(c) sending the optical line terminal said requested guaranteed bandwidth; and
(d) sending the optical line terminal said requested best effort bandwidth;
wherein said requested guaranteed bandwidth and said requested best effort bandwidth are computed using a token bucket algorithm that has two different respective token buckets for said requested guaranteed bandwidth and said requested best effort bandwidth.

21. The method of claim 20, further comprising the step of:
(e) receiving, from the optical line terminal, a service level agreement, said computing of said requested guaranteed bandwidth and said requested best effort bandwidth then being in accordance with said service level agreement.

22. The method of claim 20, wherein said requested guaranteed bandwidth is computed as a lesser of a used queue size of the optical network unit and a number of tokens in said respective token bucket of said requested guaranteed bandwidth, and wherein said requested best effort bandwidth is computed as a lesser of a used queue size of the optical network unit and a number of tokens in said respective token bucket of said best effort guaranteed bandwidth.

23. The method of claim 20, wherein said requested guaranteed bandwidth is computed as a total size of whole frames at most equal to a threshold computed as a lesser of a used queue size of the optical network unit and a number of tokens in said respective token bucket of said requested guaranteed bandwidth, and wherein said requested best effort bandwidth is computed as a total size of whole frames at most equal to a threshold computed as a lesser of a used queue size of the optical network unit and a number of tokens in said respective token bucket of said best effort guaranteed bandwidth.

24. An optical network unit operative to request upstream bandwidth from an optical line terminal by:
(a) computing a requested guaranteed bandwidth; and
(b) computing a requested best effort bandwidth;
(c) sending the optical line terminal said requested guaranteed bandwidth; and
(d) sending the optical line terminal said requested best effort bandwidth;
wherein said requested guaranteed bandwidth and said requested best effort bandwidth are computed using a token bucket algorithm that has two different respective token buckets for said requested guaranteed bandwidth and said requested best effort bandwidth.

25. A method of allocating a bandwidth budget on an optical network, comprising the steps of:
(a) receiving, from a plurality of optical network units, respective requests for permission to effect respective upstream transmissions, each said optical network unit having a respective first attribute value selected from among a plurality of values of a first attribute of said optical network units and a respective second attribute value selected from among a plurality of values of a second attribute of said optical network units;
(b) giving one said attribute priority, for allocating the bandwidth budget, over another said attribute;
(c) within each said attribute, assigning an allocation rank to said values of said each attribute; and
(d) allocating the bandwidth budget in accordance with said priority and in accordance with said allocation ranks;

wherein each said request includes a requested guaranteed bandwidth;

wherein said allocating includes selecting said optical network units that are to be allowed to effect their respective upstream transmissions by assigning each said optical network unit successively, in an order determined by said priority and by said transmission ranks, a respective portion of the bandwidth budget that equals at most said respective requested guaranteed bandwidth of said each optical network unit, until a condition, selected from the set consisting of:
  (i) the bandwidth budget is exhausted, and
  (ii) all said optical network units are assigned their respective requested guaranteed bandwidths,
is satisfied;
and wherein said successive assigning is in an ascending order of respective ratios of estimated transmission rates to requested guaranteed bandwidths of said optical network units.

26. A bandwidth allocation module, for an optical line terminal that manages a plurality of optical network units, the bandwidth allocation module being operative:
  (a) to receive, from a plurality of optical network units, each of which has a respective first attribute value selected from among a plurality of values of a first attribute of said optical network units and a respective second attribute value selected from among a plurality of values of a second attribute of said optical network units, respective requests for permission to effect respective upstream transmissions;
  (b) to give one said attribute priority, for allocating the bandwidth budget, over another said attribute;
  (c) within each said attribute, to assign an allocation rank to said values of said each attribute; and
  (d) to allocate the bandwidth budget in accordance with said priority and in accordance with said allocation ranks;

wherein each said request includes a requested guaranteed bandwidth;

wherein said allocating includes selecting said optical network units that are to be allowed to effect their respective upstream transmissions by assigning each said optical network unit successively, in an order determined by said priority and by said transmission ranks, a respective portion of the bandwidth budget that equals at most said respective requested guaranteed bandwidth of said each optical network unit, until a condition, selected from the set consisting of:
  (i) the bandwidth budget is exhausted, and
  (ii) all said optical network units are assigned their respective requested guaranteed bandwidths,
is satisfied;
and wherein said successive assigning is in an ascending order of respective ratios of estimated transmission rates to requested guaranteed bandwidths of said optical network units.

* * * * *